US011111978B2

(12) United States Patent
Prevost et al.

(10) Patent No.: US 11,111,978 B2
(45) Date of Patent: Sep. 7, 2021

(54) MECHANICAL FORCE BREAKER

(71) Applicant: XR RESERVE, LLC, Houston, TX (US)

(72) Inventors: Gregory Prevost, Spring, TX (US); William W. King, Houston, TX (US); Edward C. Spatz, Spring, TX (US)

(73) Assignee: XR Reserve, LLC, Houston, TX (US)

( * ) Notice: Subject to any disclaimer, the term of this patent is extended or adjusted under 35 U.S.C. 154(b) by 334 days.

(21) Appl. No.: 16/216,755

(22) Filed: Dec. 11, 2018

(65) Prior Publication Data

US 2019/0211896 A1 Jul. 11, 2019

Related U.S. Application Data

(60) Provisional application No. 62/598,751, filed on Dec. 14, 2017.

(51) Int. Cl.
| *F16F 7/09* | (2006.01) |
| *E21B 17/10* | (2006.01) |
| *F16F 1/06* | (2006.01) |
| *F16F 3/04* | (2006.01) |
| *F16F 1/32* | (2006.01) |

(52) U.S. Cl.
CPC .......... *F16F 7/095* (2013.01); *E21B 17/1014* (2013.01); *E21B 17/1078* (2013.01); *F16F 1/06* (2013.01); *F16F 1/32* (2013.01); *F16F 3/04* (2013.01); *F16F 2230/0047* (2013.01)

(58) Field of Classification Search
CPC ...... F16F 7/095; F16F 1/06; F16F 1/32; F16F 3/04; F16F 2230/0047; E21B 17/1014; E21B 7/1078
See application file for complete search history.

(56) References Cited

U.S. PATENT DOCUMENTS

| 1,853,933 A | 4/1932 | Schmidt |
| 2,084,638 A | 6/1937 | Goodwin |
| 2,997,325 A | 8/1961 | Peterson |
| 3,712,151 A | 1/1973 | Diehl |
| 3,918,301 A | 11/1975 | Baer |
| 4,428,302 A | 1/1984 | Herring, Jr. |
| 4,491,428 A | 1/1985 | Burr et al. |
| 4,651,981 A | 3/1987 | Passiniemi |

(Continued)

OTHER PUBLICATIONS

Arcon website https://www.arconring.com/, 2019, 2 Pages.

*Primary Examiner* — Melanie Torres Williams

(74) *Attorney, Agent, or Firm* — Michael S. McCoy; Amatong McCoy LLC

(57) ABSTRACT

The present disclosure provides for a force breaker assembly. The assembly includes a housing having a first channel, a body within the housing and including an engagement surface. A second channel is formed in the body. A spring is positioned adjacent the body. A snap ring is positioned within the housing and about the body. When a load is applied to the engagement surface that is below a preset limit, the ring remains engaged within the first and second channel, retaining the body in an extended position. When a load is applied to the engagement surface that is at or above the preset limit, the ring is expanded out of the second channel and into the first channel or is compressed out of the first channel and into the second channel, such that the body is forced into a depressed position.

24 Claims, 13 Drawing Sheets

(56) References Cited

U.S. PATENT DOCUMENTS

| | | |
|---|---|---|
| 5,165,473 A | 11/1992 | Bode |
| 6,102,378 A | 8/2000 | Gieseler et al. |
| 6,394,431 B1 | 5/2002 | Smith |
| 6,637,348 B1 | 10/2003 | Teichmann et al. |
| 7,926,883 B2 | 4/2011 | Hall et al. |
| 9,193,239 B2 | 11/2015 | Willems |
| 9,242,047 B2 | 1/2016 | Brereton et al. |
| 9,687,607 B2 | 6/2017 | Brereton et al. |
| 2012/0018962 A1 | 1/2012 | Ac et al. |
| 2013/0228069 A1* | 9/2013 | Cappeller ............ F16F 9/3242 92/169.1 |
| 2016/0032999 A1* | 2/2016 | Cappeller ............ F16F 9/0218 267/129 |
| 2018/0179823 A1 | 6/2018 | Spatz et al. |
| 2018/0179831 A1 | 6/2018 | Spatz et al. |
| 2018/0363254 A1* | 12/2018 | Cho ........................ E01D 19/04 |
| 2019/0118604 A1* | 4/2019 | Suplin ................ B60G 17/0152 |
| 2019/0186589 A1* | 6/2019 | Gandhi .................... F16F 1/32 |

* cited by examiner

MECHANICAL FORCE BREAKER

CROSS-REFERENCE TO RELATED APPLICATIONS

The present application claims the benefit of U.S. Provisional Patent Application No. 62/598,751, filed on Dec. 14, 2017 and entitled "Mechanical Force Breaker", the entirety of which is incorporated herein by reference and made a part of the present disclosure.

FIELD

The present disclosure relates to mechanical force breakers, systems and apparatus including the same, and methods of making and using the same.

BACKGROUND

In the field of downhole drilling, components are subjected to axial, torsional, and lateral loads, each of which produce vibrations. Structures are typically employed in downhole assemblies to control or mitigate debilitating conditions, such as slip stick, string whirl, off-center rotation, and buckling. These conditions can occur in straight, smooth wellbores. These conditions can be exacerbated in directional wellbores, where tortuosity, transition lips, spiraling, and doglegs add to the loads on components. Downhole assembly and tool designers have proposed myriad solutions aimed at controlling or mitigating such downhole vibrations. These include, but are not limited to, full hole stabilizers, under gauge stabilizers, roller reamers, polycrystalline diamond compact (PDC) reamers, and shock tools.

One problem of stabilizers has been one of geometry. An assembly with full hole or near full hole stabilizers can get stuck when tripping in or out of a tortuous wellbore. An assembly with significantly under gauge stabilizers may fail to keep the assembly centralized, by failing to touch the wellbore wall where and when needed. One solution proposed for this has been to provide spring or hydraulic pressure behind the stabilizer blades, such that they can reach out to the wellbore wall but depress with increasing load. The drawback of these solutions is that such stabilizers can enter into a harmonic lateral movement, constantly moving in response to lateral loads.

Another typical aspect of directional drilling has been to employ near full hole gauge stabilizers in assemblies employed to drill the curve section. Once the curve has been built, the assembly is tripped out and the stabilizers are replaced with smaller diameter, more under gauge stabilizers. This practice requires an expensive and time-consuming trip, but is used to reduce torque and drag in the lateral section of the hole. Torque and drag are primary limiting factors in the distance a lateral section can be drilled; the shorter the lateral section, the less ultimate hydrocarbon production that can be derived from the well.

What is needed is a device design and component that can hold a stabilizing surface in a position with a minimum of reactive movement up to a predetermined load limit, at which point the surface holding device allows for the retraction of the surface. Because radial wall thickness is limited in downhole tool bodies, the device can be configured to occupy a relatively small radial length.

BRIEF SUMMARY

One aspects of the present disclosure include a force breaker assembly. The assembly include a housing having a first channel formed therein. A force resistance body is positioned at least partially within the housing, and includes a force resistance engagement surface thereon. A second channel is formed in the force resistance body. A return force member is positioned adjacent the force resistance body, opposite the force resistance engagement surface. A force resistance ring is positioned within the housing and at least partially about the force resistance body. When a load is applied to the force resistance engagement surface that is below a preset limit, the force resistance ring remains engaged within the first channel and the second channel, retaining the force resistance body in an extended position. When a load is applied to the force resistance engagement surface that is at or above the preset limit, the force resistance ring is expanded out of the second channel and into the first channel or the force resistance ring is compressed out of the first channel and into the second channel, such that the force resistance body is forced into a depressed position. In the depressed position, the force resistance body is depressed at least partially into the housing.

Other embodiments provide for a stabilizer blade assembly that includes a stabilizer having a blade. At least one force breaker assembly is positioned on the blade. The at least one force breaker assembly includes a housing, a force resistance body positioned at least partially within the housing and including an engagement surface, a return force member positioned adjacent the force resistance body opposite the force resistance engagement surface, and a force resistance ring positioned within the housing and at least partially about the force resistance body. The force resistance ring maintains a position of the force resistance body relative to the housing until a preset load is applied to the engagement surface. After the preset load is applied to the engagement surface, the force resistance body depresses into the housing.

Further embodiments relate to a method of bearing load imparted onto a component. The method includes positioning a force breaker assembly onto the component. The force breaker assembly includes a housing, a body positioned at least partially within the housing and having an engagement surface thereon, and a force resistance ring engaged with the body and the housing. The method includes bearing load on the engagement surface of the force breaker assembly. If the load is below a preset limit, the ring maintains a position of the body in an extended position and, if the load is above the preset limit, the ring expands or compresses such that the body depresses at least partially into the housing into a depressed position.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

Figure 1:
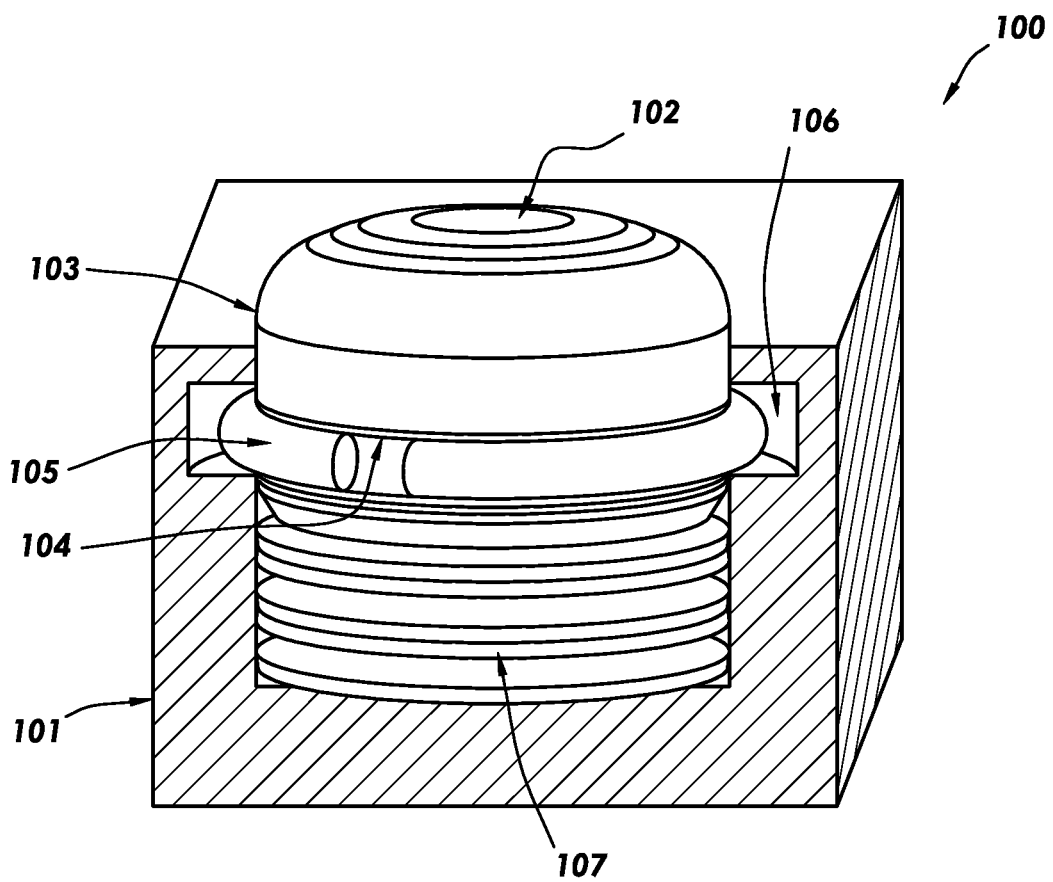
FIG. 1 is a cross-sectional view of a force breaker housing depicting moving parts of a force breaker assembly positioned therein.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain aspects of the present disclosure include a force breaker that is capable of holding a stabilizing surface in a position with a minimum of reactive movement up to a predetermined load limit, at which point the force breaker allows for the retraction of the stabilizing surface. Some aspects of the present disclosure include an assembly (force breaker assembly) that provides a load bearing surface that is tensioned to remain substantially in place to a predetermined limit range of load, at which point the surface depresses to relieve the load. In one embodiment, the surface remains depressed after the load limit has been exceeded. In another embodiment, the surface re-extends to the original position once the load is relieved. The force breakers and assemblies thereof provided herein may be deployed as a primary surface support, or as a secondary fail-safe mechanism in support of shock absorbers, mechanical travel limiters or electrical travel limiters. The force breakers and assemblies thereof disclosed herein have broad utility in various applications where excessive loads may cause mechanical failure. Some such applications include, but are not limited to, downhole drilling equipment, aircraft landing gear, rail car shock absorbers, automotive struts, shocks, bumpers and travel limiters, and machine tool travel limiters. In some downhole applications, as radial wall thickness is limited in downhole tool bodies, the force breaker may be configured (e.g., sized, shaped and/or arranged) to occupy a relatively small radial length. Turning now to the Figures, it is noted that, throughout the Figures, like reference numerals denote like elements.

Force Breaker

FIG. 1 depicts force breaker assembly 100, including force breaker housing 101. Force breaker assembly 100 includes force resistance body 103, which is at least partially positioned within housing 101. Resistance surface 102 is the outermost portion of force resistance body 103, and forms an engagement surface for receiving and bearing load. Force resistance body 103 includes or defines a channel, taper angle 104, defining a contour of the surface of force resistance body 103 that is configured (e.g., sized, shaped, positioned, and/or arranged) to engage with resistance ring 105.

Resistance ring 105, which may be a snap ring or retaining ring, is positioned about force breaker body 103. Force breaker housing 101 includes a channel, expansion channel 106, formed therein. Resistance ring 105 is positioned within and/or in contact with taper angle 104 and expansion channel 106.

Force breaker assembly 100 includes a return force member. While the return force member is shown in FIG. 1 as a stack of Belleville springs 107 positioned to provide a return force to force resistance body 103, the return force member is not limited to this structure, and may be any structure capable of applying a force to body 103 to push body 103 from the depressed position to the extended position.

As shown in FIG. 1, force resistance body 103 is in a first, extended position. With resistance ring 105 engaged within both taper angle channel 104 and expansion channel 106, resistance ring 105 maintains this position of force resistance body 103 relative to housing 101 and springs 107.

Figure 2A:
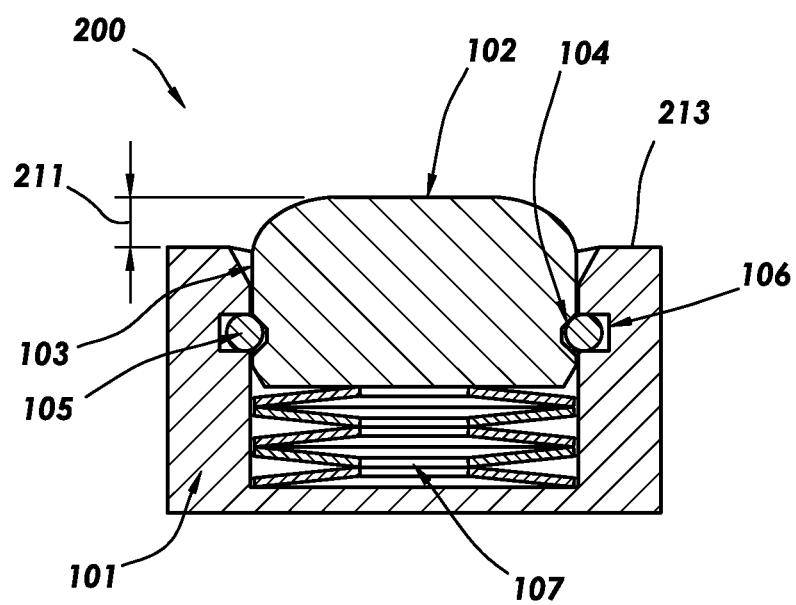
FIG. 2A is a cross-sectional view of a force breaker assembly in an extended position.

FIG. 2A depicts force breaker assembly 200, which is the same as or substantially similar to force breaker assembly 100. Force breaker assembly 200 is shown in the extended position, with resistance surface 102, the outermost engagement surface of force resistance body 103, positioned above top surface 213 of housing 101 by distance 211. Resistance ring 105 is in contact with and engaged within both taper angle channel 104 and expansion channel 106.

Figure 2B:
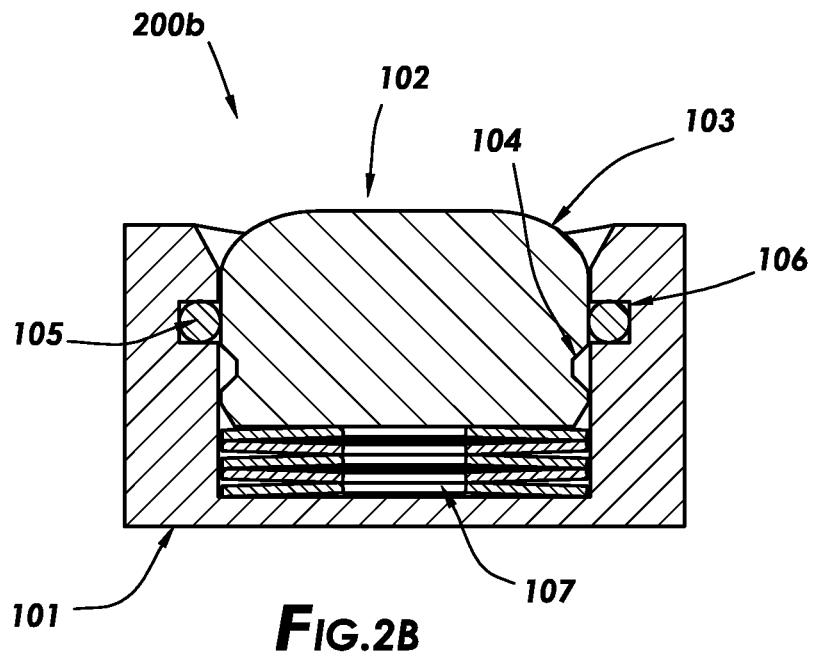
FIG. 2B is a cross-sectional view of a force breaker assembly, the same or similar to that of FIG. 2A, but in a compressed position.

FIG. 2B depicts force breaker assembly 200b, which is the same as or substantially similar to force breaker assemblies 100 and 200, but in the depressed position. In operation, resistance ring 105 maintains a position of force resistance body 103 relative to housing 101 and springs 107, as resistance ring 105 is engaged within both taper angle channel 104 and expansion channel 106 (as shown in FIG. 2A). Resistance ring 105 is capable of maintaining force resistance body 103 in the extended position up to a preset level of load. Once the preset level of load applied to resistance surface 102 is exceeded, resistance ring 105 expands into expansion channel 106 (as shown in FIG. 2B). The tapered side of taper angle channel 104 encourages and facilitates the movement of resistance ring 105 fully out of taper angle channel 104 and further (or fully) into expansion channel 106. Thus, the preset load is the load required to be applied to surface 102 in order to move resistance ring 105 fully out of taper angle channel 104 and further (or fully) into expansion channel 106. With resistance ring 105 disengaged from within taper angle channel 104 and engaged within expansion channel 106, the load on surface 102 pushes force resistance body 103 in the direction of the load, toward spring 107, such that force resistance body 103 depresses into spring 107 and spring 107 also depresses.

Force Breaker with Capture Groove and Retraction Socket

Figure 3:
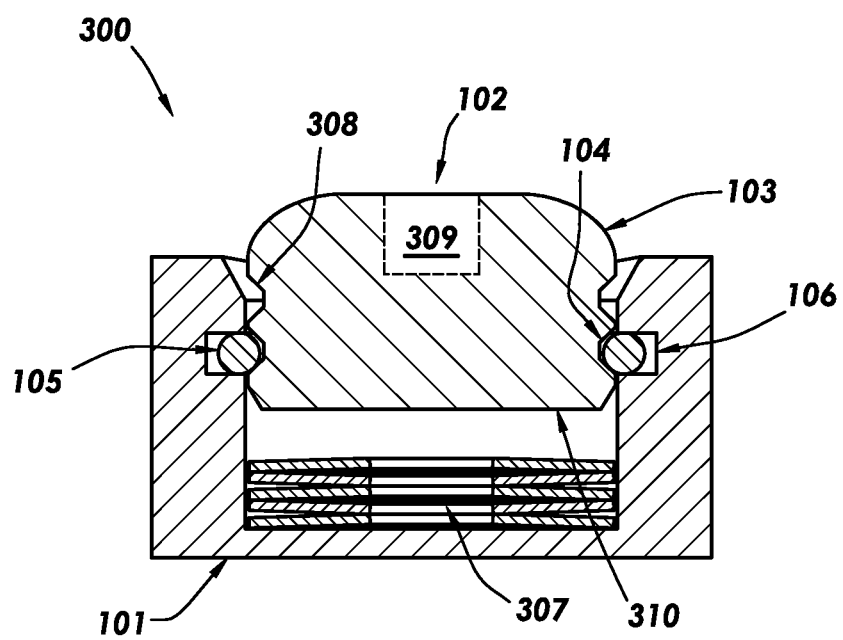
FIG. 3 is a cross-sectional view of another embodiment of a force breaker assembly with a capture groove, in an extended position.

FIG. 3 depicts force breaker assembly 300 in an extended or non-depressed position, with resistance surface 102 positioned above top surface of housing 101. Force breaker assembly 300 includes capture groove 308 formed within force resistance body 103. Capture groove 308 may be the same or similar to taper angle channel 104, forming a channel or contour in the surface of force resistance body 103 capable of engaging with resistance ring 105. Force breaker assembly 300 has a relatively shorter stack of Belleville springs 307, in comparison to springs 107 shown in FIGS. 1, 2A and 2B. As shown in FIG. 3, springs 307 are spaced apart from a landing of lower surface 310 of force resistance body 103. As such, when force breaker assembly 300 is in the extended or non-depressed position, springs 307 and force resistance body 103 are not in contact.

Force breaker assembly 300 includes retraction socket 309, which may be a threaded or J-locked socket for the insertion of a retraction member (now shown), such as an I-bolt. In other embodiments, the retraction socket may be a full through hole extending fully through the force resistance body, and may be partially or fully threaded, allowing for the insertion of a drive rod to effect retraction of the force resistance body 103. As such, socket 309 may be used to reposition a depressed force resistance body 103 into an extended position.

Figure 4:
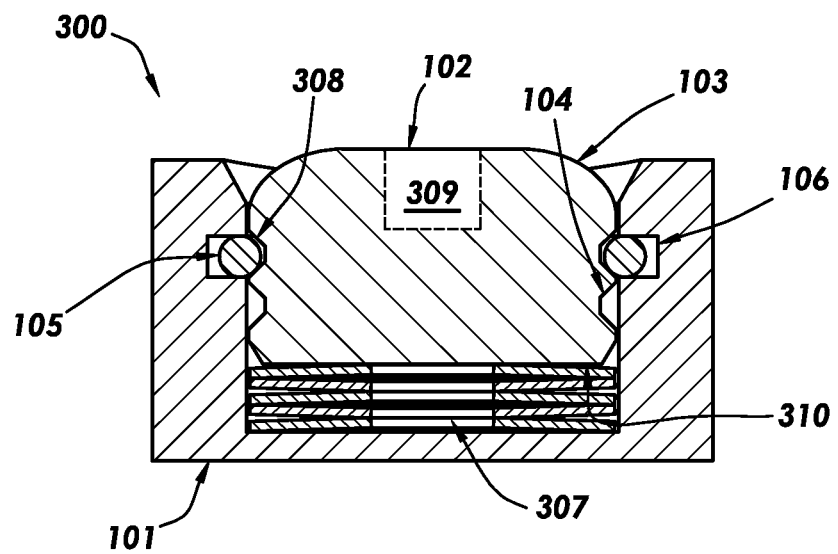
FIG. 4 is a cross-sectional view of the force breaker assembly of FIG. 3, with a resistance surface body depressed to the capture groove depth, in a compressed position.

FIG. 4 depicts force breaker assembly 300 in the depressed position, with the force resistance body 103 depressed to a depth such that resistance ring 105 disengages from within taper angle channel 104 and is engaged within capture groove 308. Lower surface 310 of force resistance body 103 is in contact with springs 307. In some aspects, capture groove 308 prevents body 103 from returning to the extended position. In some aspects, capture groove 308 may define a second level of preset load that must be overcome prior to allowing further compression of force resistance body 103. While capture groove 308 is shown as having tapered angle sides, similar to taper angle channel 104, in other embodiments capture groove 308 may have straight sides the same or similar as expansion channel 106, defining a point past which force resistance body 103 cannot be further depressed.

Force Breaker with Taper Angle Formed in Housing

Figure 5A:
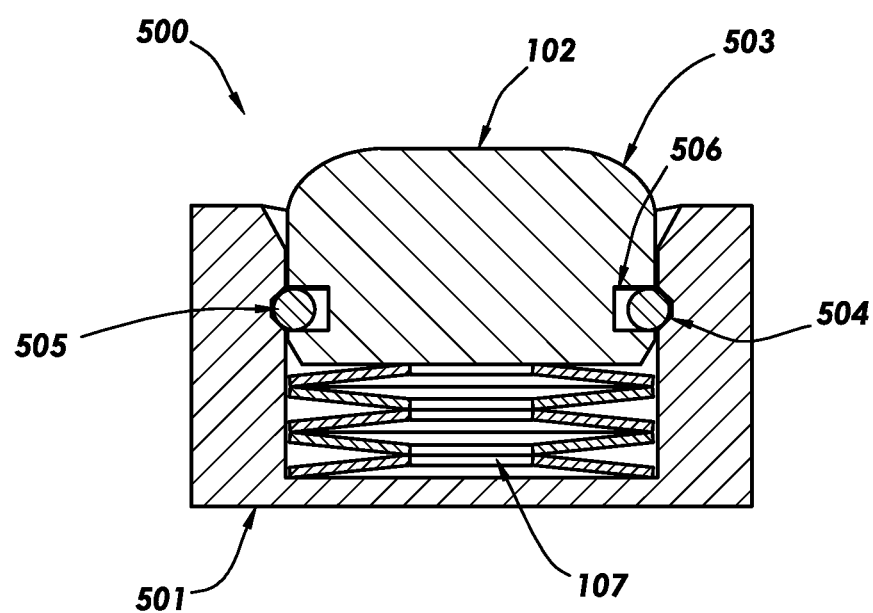
FIG. 5A is a cross-sectional view of another embodiment of a force breaker assembly employing compression resistance of a ring, in an extended position.

FIG. 5A depicts force breaker assembly 500, employing compression resistance of ring 505, in contrast to the expansion resistance of FIGS. 1-4. That is, the present load to depress force resistance body 503 must be sufficient to compress ring 505 into a channel in force resistance body 503, compression channel 506, as opposed to expanding the ring into a channel in the housing. Force breaker housing 501 includes taper angle channel 504, which is a contoured surface of housing 501 configured to engage with ring 505. In the non-depressed position, ring 505 is engaged within taper angle channel 504 and compression channel 506.

Figure 5B:
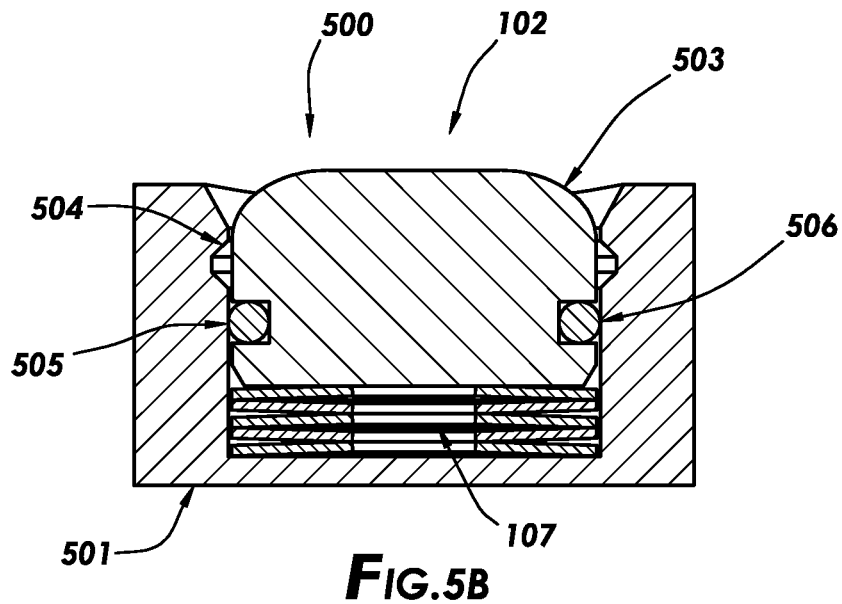
FIG. 5B is a cross-sectional view of a force breaker assembly, the same or similar to that of FIG. 5A, but in a compressed position.

FIG. 5B depicts force breaker assembly 500, the same or similar to that of FIG. 5A, but in a depressed position. In operation, when sufficient force is applied on resistance surface 102, the tapered sides of channel 504 push ring 505 into channel 506. Once ring 505 is fully within channel 506 and/or clear of channel 504, force resistance body 503 is allowed to move in the direction of load, towards springs 107.

Figure 5C:
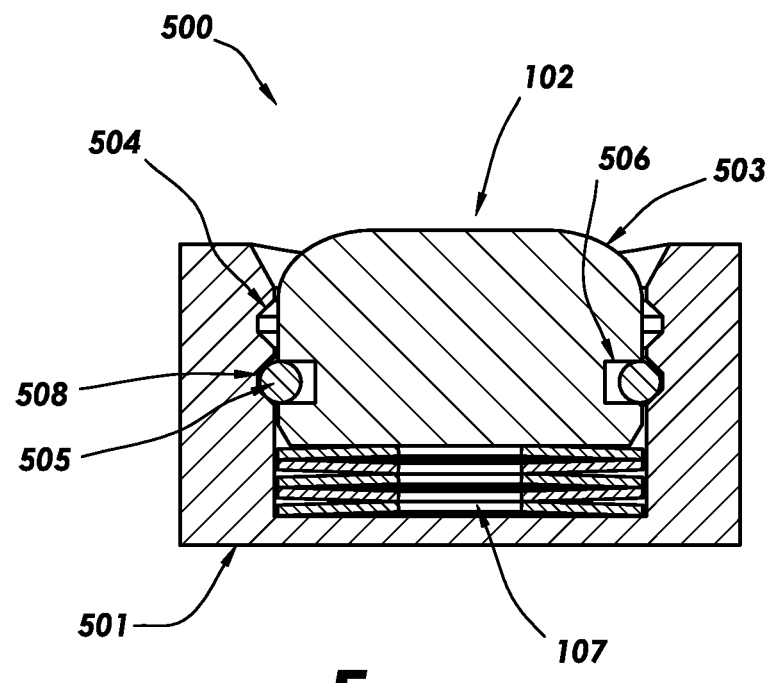
FIG. 5C is a cross-sectional view of a force breaker assembly, the same or similar to that of FIG. 5B, but with an additional capture groove formed in the housing.

FIG. 5C depicts force breaker assembly 500, the same or similar to that of FIG. 5B, but with a captured groove 508 formed in housing 501. In operation, captured groove 508 may perform the same functions as captured groove 308.

Break Over Force

Figure 6:
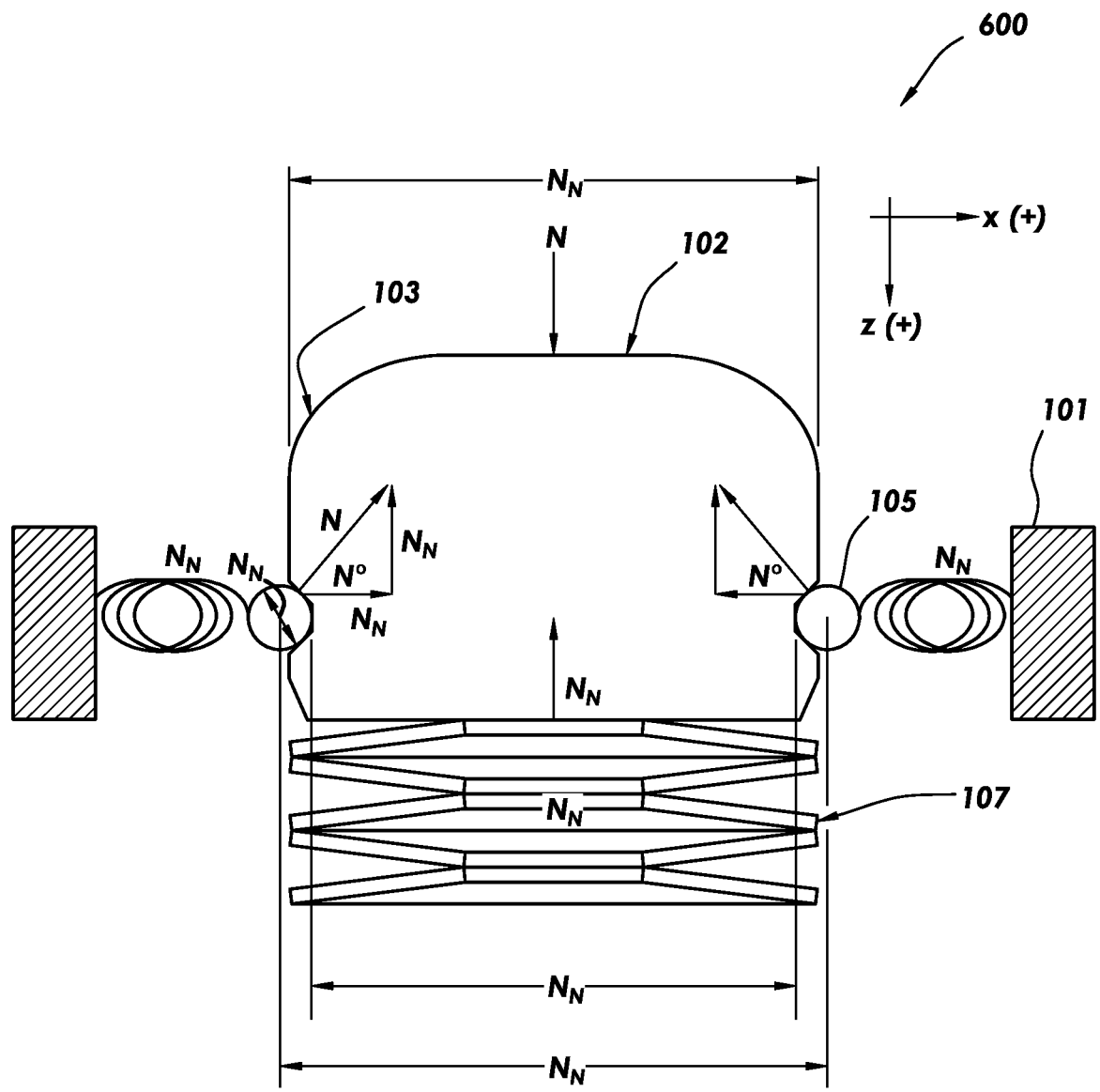
FIG. 6 is a cross-sectional view depicting moving parts of a force breaker assembly, and depicting various terms, including loads, constants, forces, dimensions, and angles, that may be employed in calculating break over force of a given force breaker assembly.

FIG. 6 depicts force breaker assembly 600, showing various forces, constants, dimensions, limits, angles, and displacements relevant to operation of at least some of the force breakers disclosed herein, and relevant in calculating the break over force of a given force breaker assembly. For example, FIG. 6 shows: "$k_s$", which is the ring spring constant (lb/in) of the resistance rings disclosed herein; "$k_r$", which is the return spring constant (lb/in); "$D_{so}$", which is the ring center diameter (in); "$D_i$", which is the ring cross section diameter (in); "N", which is the ring resultant force (lb); "$N_x$", which is the ring radial force (lb); "$N_z$", which is the ring axial force (lb); "$F_r$", which is the return axial force (lb); "P", which is the overload limit (lb); "$\alpha$", which is the taper angle (°); and "$D_p$", which is the force body diameter (in). Other relevant values include "Fs", which is the ring force (lb); "$x_0$", which is the ring preload displacement (in); and "$z_0$", which is the return spring preload displacement (in). In FIG. 6, the ring spring constant is considered at two diametrically opposing contact points on the ring spring. Using such values, calculations may be employed to calculate the break over force of a given force breaker assembly.

For example, the following calculations may be utilized in determining the break over force of a given force breaker assembly:

Sum of Forces in Z Equal Zero

Sum of Forces in Z equal zero $$\sum F_z = 0 \quad \begin{array}{l} P - (2 \cdot N_z) - (F_r) = 0 \\ P = (2 \cdot N_z) + (F_r) \end{array}$$

Sum of Forces in X equal zero $$\sum F_x = 0 \quad \begin{array}{l} N_x - (F_s) = 0 \\ N_x = (F_s) \end{array}$$

Where, $x = z \cdot \tan \alpha$ $F_s = k_s(x + x_0)$ $F_r = k_r(z + z_0)$ $N_z = k_s(z \tan \alpha + x_0) \cdot \tan \alpha$ Substituting equations yields:

$P = 2 \cdot [k_s(z \tan \alpha + x_0) \cdot \tan \alpha] + k_r(z + z_0)$

Figure 7:
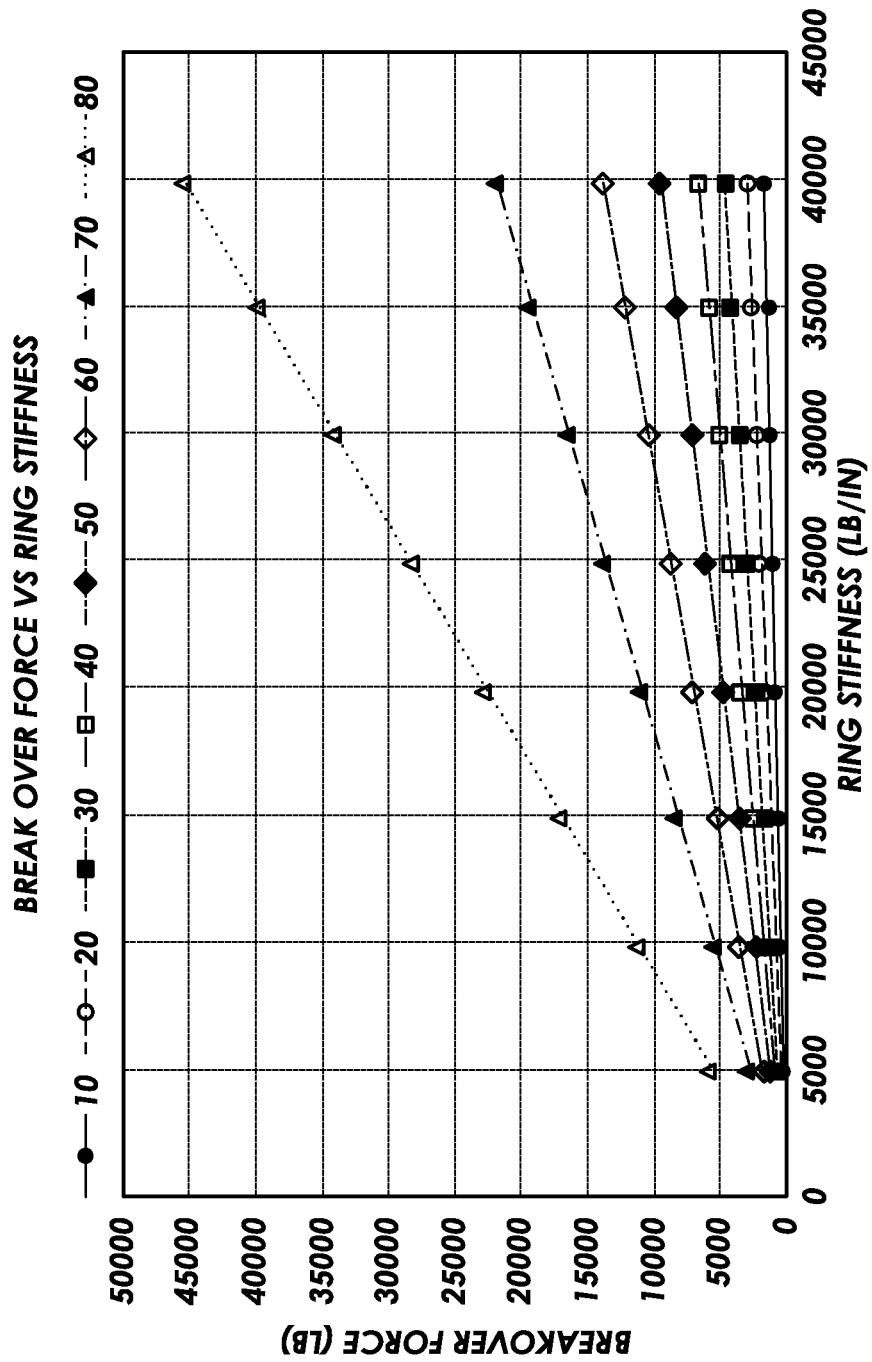
FIG. 7 is a graph of break over force vs. ring stiffness.

FIG. 7 is a graph of break over force vs. ring stiffness.

Figure 8A:
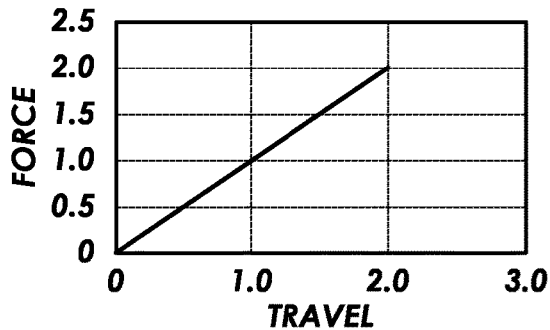
FIG. 8A is a graph of typical force vs. travel profile of a standard compression spring or shock.

FIG. 8A is a graph showing the typical force vs. travel profile of a standard compression spring or shock, where force and travel exhibit a gradual, consistent, and linear relationship.

Figure 8B:
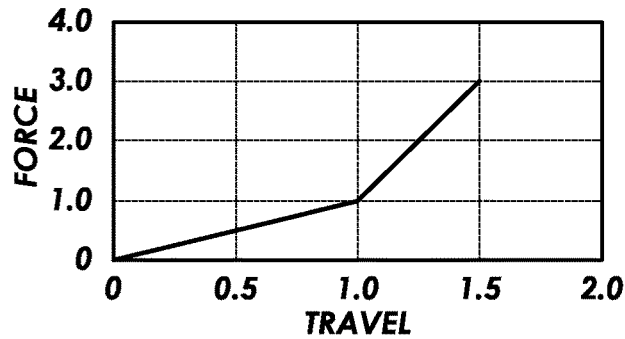
FIG. 8B is a graph of typical force vs. travel profile of a standard compression spring or shock backed-up by a secondary compression spring.

FIG. 8B is a graph showing the typical force vs. travel profile of a standard compression spring or shock backed up by a secondary compression spring, where force and travel exhibit a first linear relationship associated with the standard compression spring or shock (from travel=0 to travel=1), followed by a second linear relationship associated with the secondary compression spring (from travel=1 to travel=1.5).

Figure 8C:
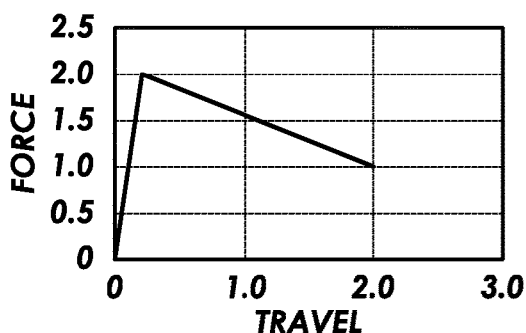
FIG. 8C is a graph of an exemplary force vs. travel profile of a force breaker of the present disclosure.
Figure 8D:
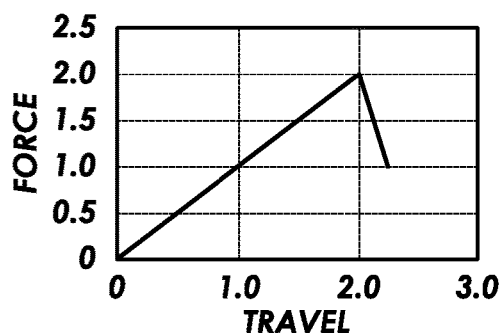
FIG. 8D is a graph of an exemplary force vs. travel profile of a standard compression spring backed-up by a force breaker of the present disclosure.
Figure 8E:
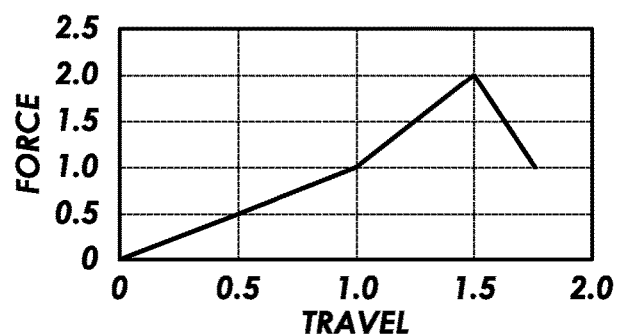
FIG. 8E is a graph of an exemplary force vs. travel profile of a standard compression spring or shock backed-up by a secondary compression spring, and further backed-up by a force breaker of the present disclosure.

FIG. 8C is a graph showing an exemplary force vs. travel profile of a force breaker of the present disclosure. As shown, travel is very limited beginning at "travel=0" until the force equals 2 which, in this example, is the preset load required to expand or compress the resistance ring to allow force resistance body to depress. After this point, the slope of the force vs. travel plot reduces as the force is resisted by the spring (e.g., 107) positioned below the force resistance body rather than by the resistance ring. FIG. 8D is a graph showing an exemplary force vs. travel profile of a standard compression spring backed up by a force breaker of the present disclosure. FIG. 8E is a graph showing an exemplary force vs. travel profile of a standard compression spring or shock backed up by a secondary compression spring, and further backed up by a force breaker of the present disclosure.

As is evident from these graphs, the force required per travel may be manipulated by varying the structure or combination of structures used to bear the load, including the use of one or more of standard compression springs, shocks, force breakers of the present disclosure, or combinations thereof.

Stabilizer Blade Fitted with Force Breaker Assemblies

Figure 9A:
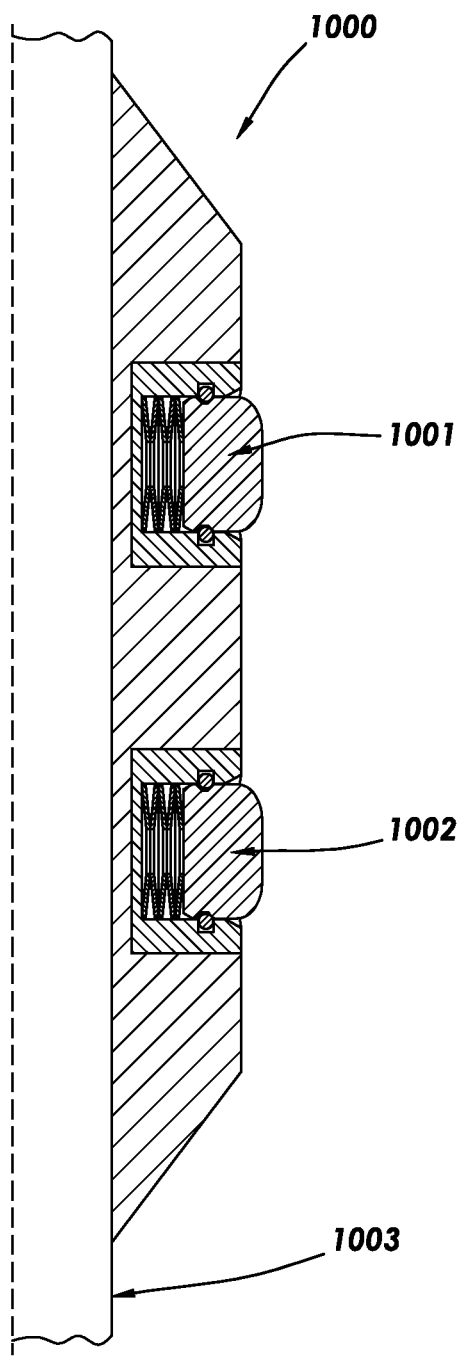
FIG. 9A is a partial cross-sectional view of a stabilizer blade fitted with upper and lower radially aligned force breaker assemblies.

FIG. 9A is a partial, cross-sectional view of stabilizer 1003 including stabilizer blade 1000 fitted with upper and lower radially aligned force breaker assemblies 1001 and 1002, which may be coupled with and/or embedded into blade 1000. Force breaker assemblies 1001 and 1002 may be any force breaker assembly in accordance with the present disclosure including, but not limited to, the force breaker assemblies shown in any of FIGS. 1-6, 10, and 11 of the present disclosure. A given stabilizer may have multiple blades (not shown) fitted with multiple force breaker assemblies. A given blade may have one, two, three or more force breaker assemblies, which may vary with the particular application and/or at the discretion of the designer of the stabilizer.

Figure 9B:
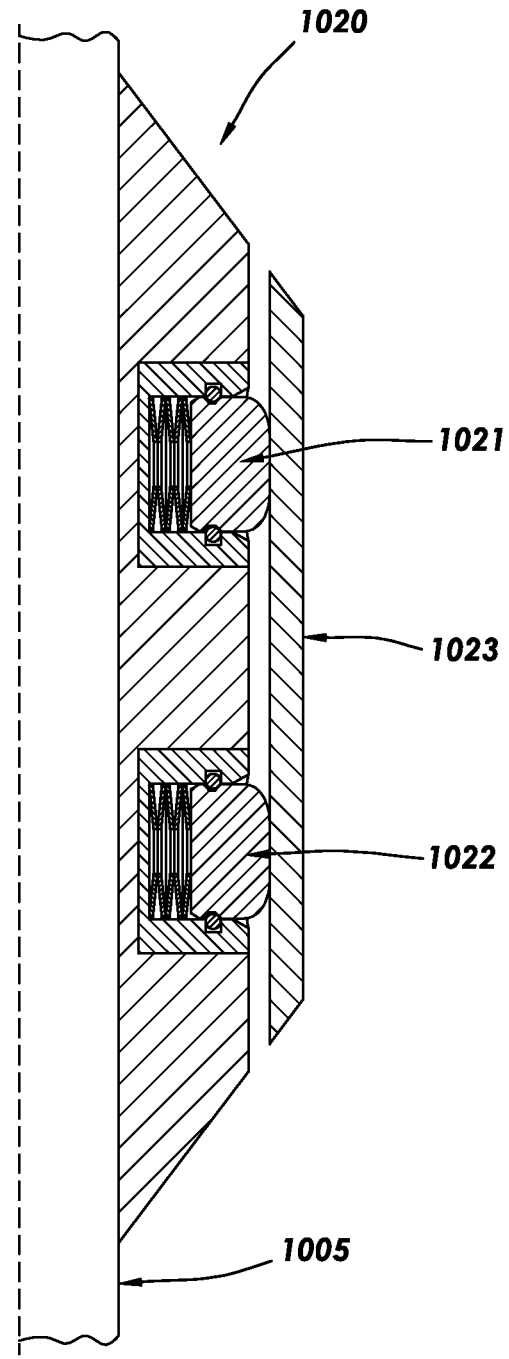
FIG. 9B is a partial cross-sectional view of a stabilizer blade fitted with upper and lower radially aligned force breaker assemblies, and additionally mounted with an outer blade face.

FIG. 9B is a partial, cross-sectional view of stabilizer 1005 with base stabilizer blade 1020 fitted with upper and lower radially aligned force breaker assemblies 1021 and 1022, and additionally mounted with an outer blade face 1023, which may be coupled with assemblies 1021 and 1022. Force breaker assemblies 1021 and 1022 may be any force breaker assembly in accordance with the present disclosure including, but not limited to, the force breaker assemblies shown in any of FIGS. 1-6, 10, and 11 of the present disclosure. A given stabilizer may have multiple base stabilizer blades (not shown) fitted with multiple force breaker assemblies supporting outer blade faces. A given base stabilizer blade may have one, two, three, or more force breaker assemblies, which may vary with the particular application and/or at the discretion of the designer of the stabilizer.

While shown and described as stabilizers 1003 and 1005, such structures may be representative of any of the various structures in which the force breaker assemblies of the present disclosure may be used.

Dual Compression Spring Shock Assembly

Figure 10:
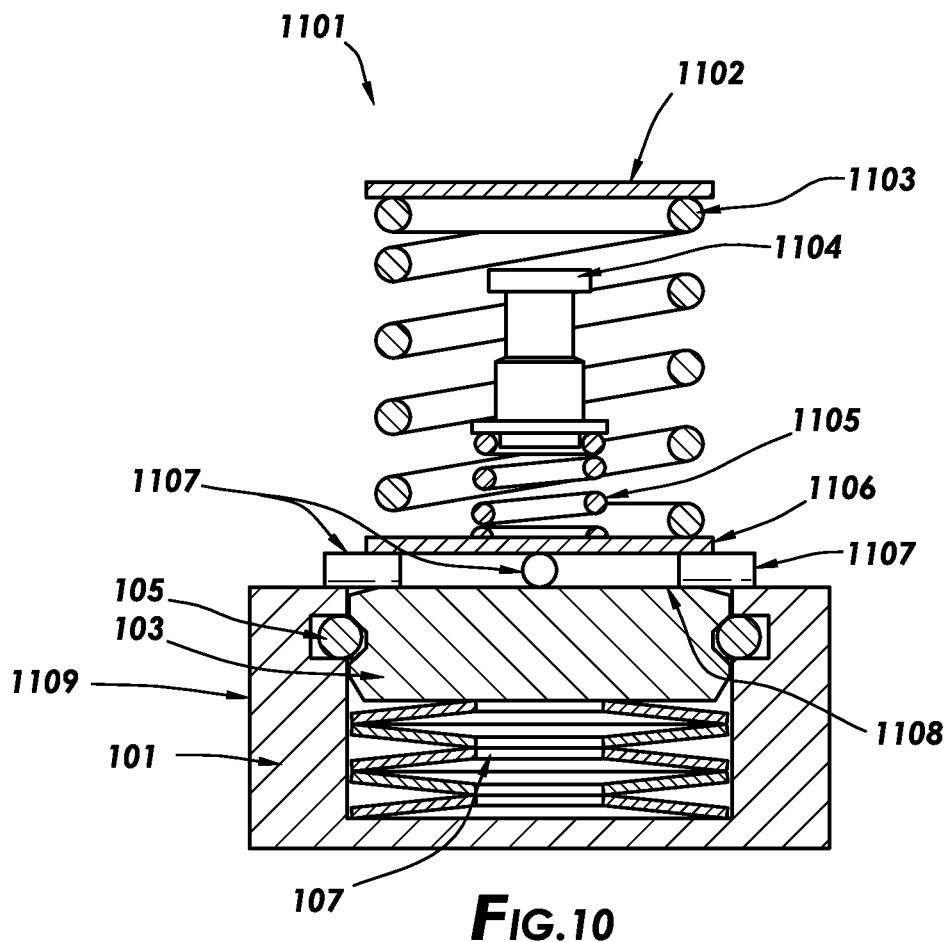
FIG. 10 is a cross-sectional view of a dual compression spring shock assembly mounted atop a base "fail safe" force breaker assembly.

FIG. 10 is a cross-sectional view of dual compression spring shock assembly 1101 attached via shear pins 1107 to a base "fail-safe" force breaker assembly 1109. Primary load bearing surface 1102 is mounted on top of primary compression spring coil 1103. Secondary load bearing surface 1104 is connected to secondary compression spring 1105. Lower spring base 1106 is attached to shear pin 1107 assemblies and springs 1103 and 1105. Shear pins 1107, in aggregate, may be rated to break under full compression loading of dual compression spring shock assembly 1101; thereby, allowing base 1106 to engage load bearing surface 1108 of force breaker assembly 1109. Force breaker assembly 1109 may be any force breaker assembly in accordance with the present disclosure including, but not limited to, the force breaker assemblies shown in any of FIGS. 1-6 and 11 of the present disclosure.

In operation, spring 1103 initially bears load via surface 1102. When load is sufficient to depress spring 1103 to be level with or below spring 1105, then spring 1105 bears at least some of the load via surface 1104. When load is sufficient to break shear pins 1107, base 1106 contacts surface 1108 (which may be the same as resistance surface 102), such that force resistance body 103 bears at least a portion of the load. When load is sufficient to compress or expand resistance ring 105 (depending on the embodiment of force breaker assembly used), springs 107 bear at least a portion of the load.

Force Breaker with Caged Roller Ball

Figure 11:
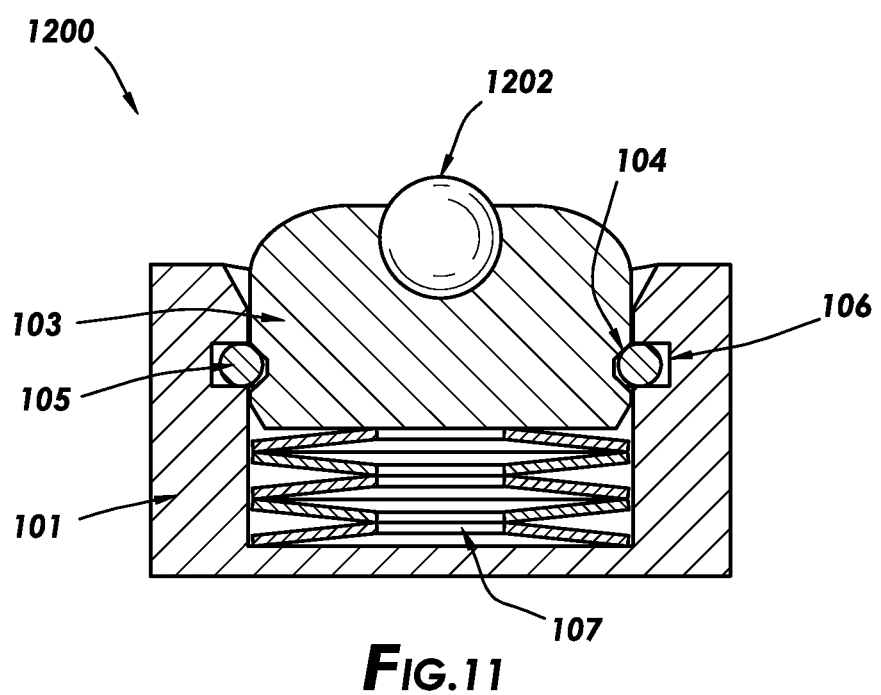
FIG. 11 is a cross-sectional view of another embodiment of a force breaker assembly, similar to that shown in FIG. 2, including a caged roller ball on the outermost surface.

FIG. 11 is a cross-sectional view of a force breaker assembly 1200, which includes caged roller ball 1202 positioned on or in force resistance body 103 as the outermost surface thereof. Caged roller ball 1202 allows for torque and drag to be reduced, such as when force breaker assembly 1200 is deployed in downhole stabilizer applications.

Force Breaker with Abradable or Dissolvable Surface

Figure 12A:
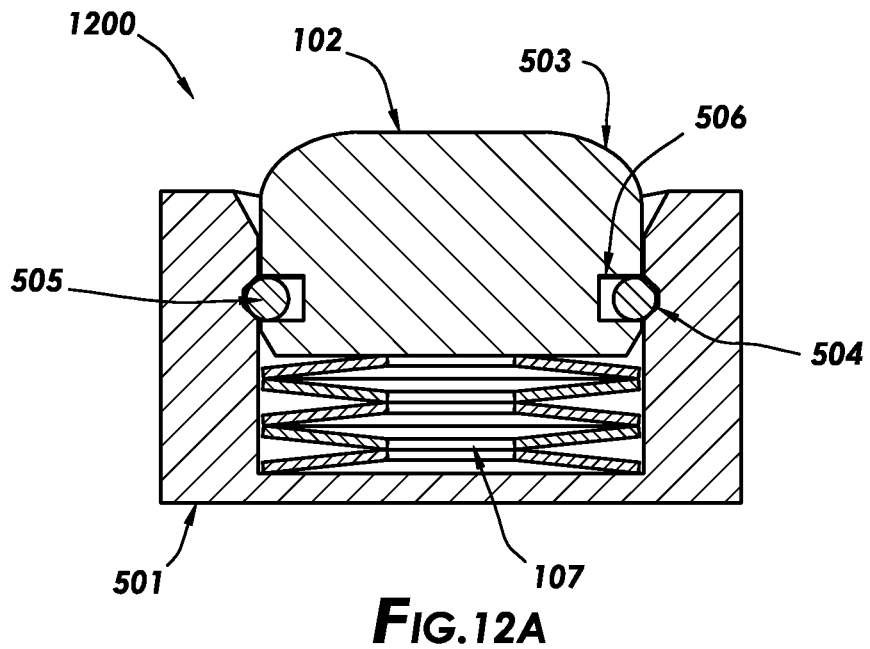
FIG. 12A depicts a force breaker assembly prior to being partially dissolved or abraded.
Figure 12B:
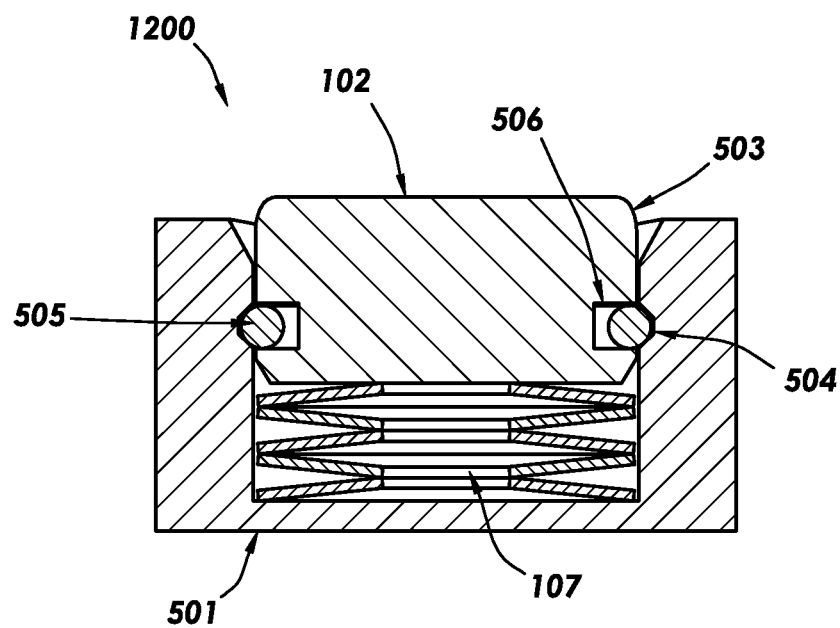
FIG. 12B depicts the force breaker assembly of FIG. 12A after being partially dissolved or abraded.

In some embodiments, the outer resistance surface of the force breaker is made of a relatively highly abradable material, or a dissolvable material, such that the extension of the force resistance body may change over time during downhole use. Such embodiments may be advantageous in applications where the full diameter of, for example, a stabilizer is desired early in a run, and a smaller diameter is desired later in the run. The outer force resistance surface may reduce over time, while still being capable of reacting (e.g., reacting instantaneously) to an overload condition. FIG. 12A depicts one example of such an embodiment of force breaker assembly 1200 prior to being partially dissolved and/or abraded, and FIG. 12B depicts the same embodiment after being partially dissolved and/or abraded. As is evident, the surface 102 has been partially abraded and/or dissolved and is positioned closer to the housing 101.

Force Breaker with Dissolvable Puck

Figure 13A:
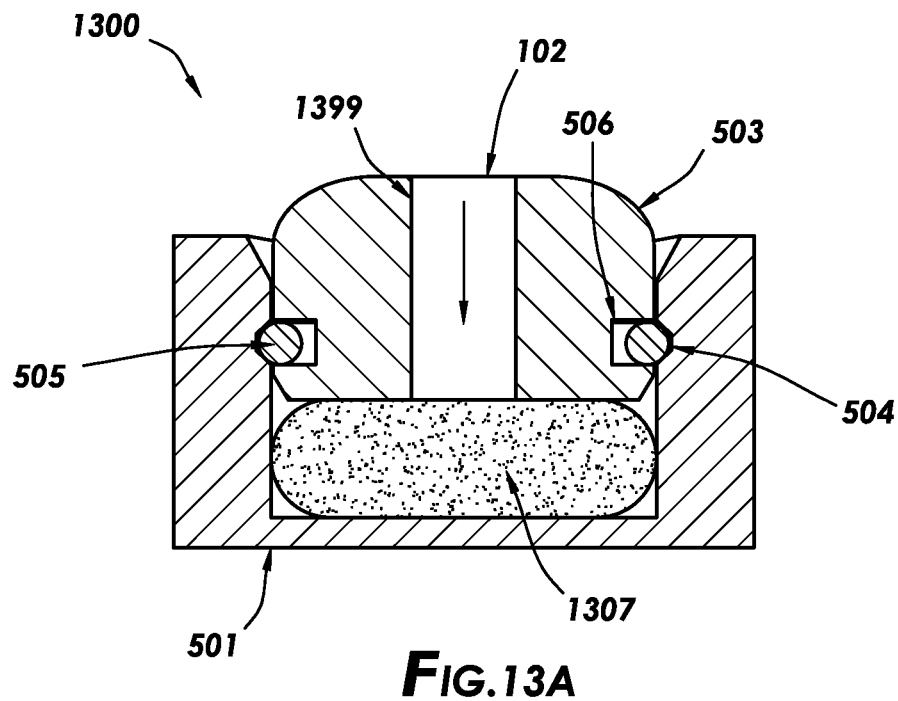
FIG. 13A depicts a force breaker assembly with a puck, prior to dissolution.
Figure 13B:
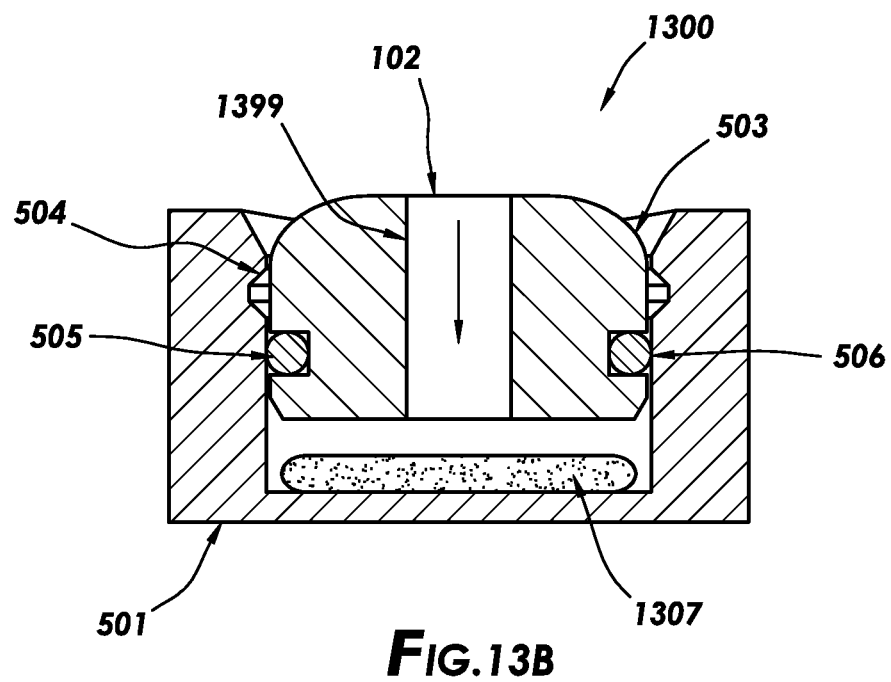
FIG. 13B depicts the force breaker assembly of FIG. 13A after dissolution of the puck.

In yet another embodiment, the Belleville spring stack (e.g., 107) may be replaced by a dissolvable puck, such that early in a run the force resistance body (e.g. 103) cannot be depressed, but later in the run, when drilling fluid has at least partially dissolved the puck, force resistance body can be depressed from an overload. In some such embodiments, drilling fluid may contact the forced resistance body via a hole extending from the resistance surface (e.g., 102). For example, FIGS. 13A and 13B depict an example of such an embodiment prior to and after dissolution of a puck. Force breaker assembly 1300 includes through-hole 1399 providing a pathway for fluid to flow into contact with puck 1307. In FIG. 13B, puck 1307 is partially dissolved relative to FIG. 13A.

Force Breaker that Generates a Signal

Figure 14:
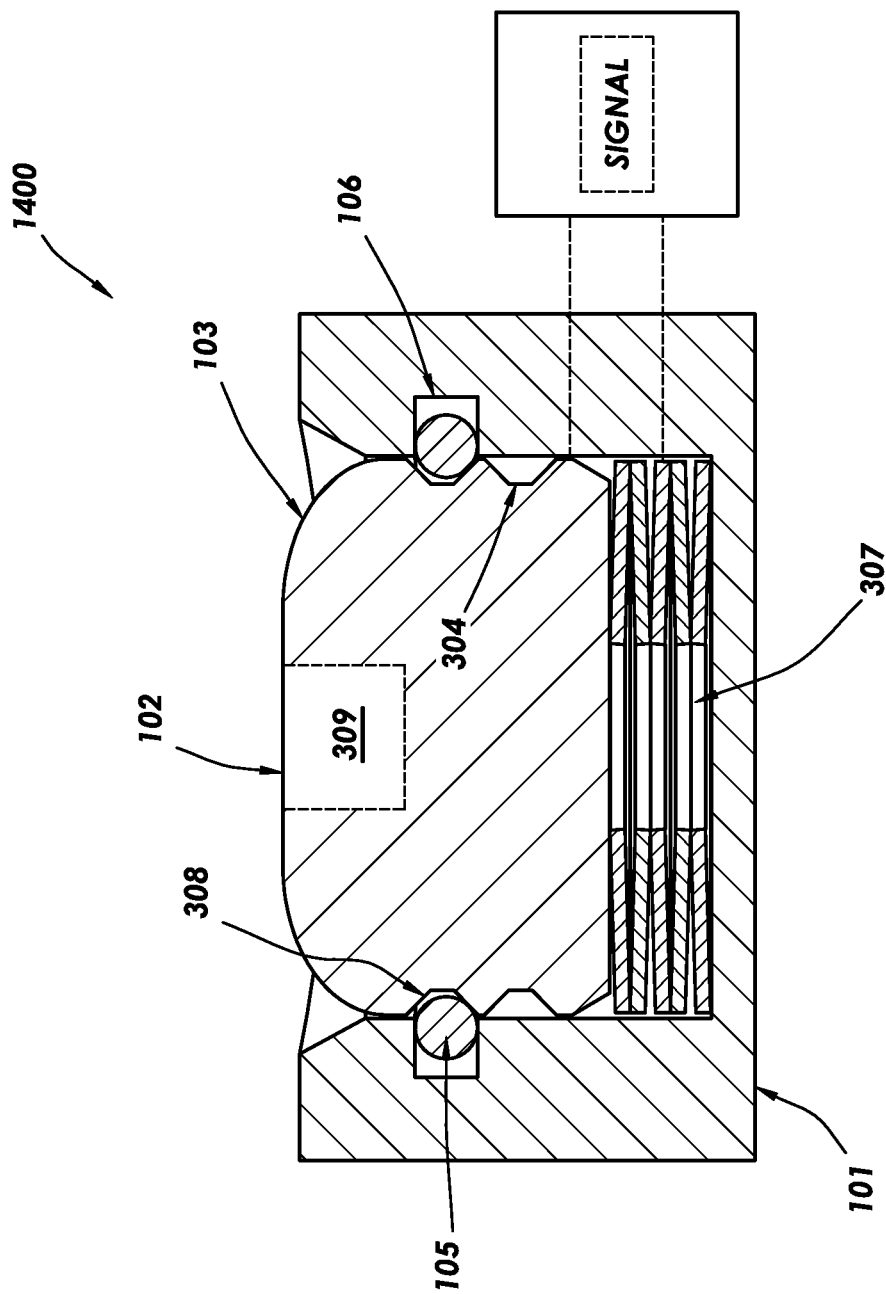
FIG. 14 illustrates an electrical circuit that may be completed upon contact between a force resistance body and a spring.

In yet another embodiment, a depression of force resistance body (e.g., 103) completes an electrical circuit which generates a signal indicating that the force resistance body has been depressed. For example, with reference to FIGS. 3, 4 and 14, an electrical circuit may be completed upon contact between force resistance body 103 and spring 307, such that a signal is generated, as shown with assembly 1400 in FIG. 14.

Force Breaker with Electric Actuator

Figure 15A:
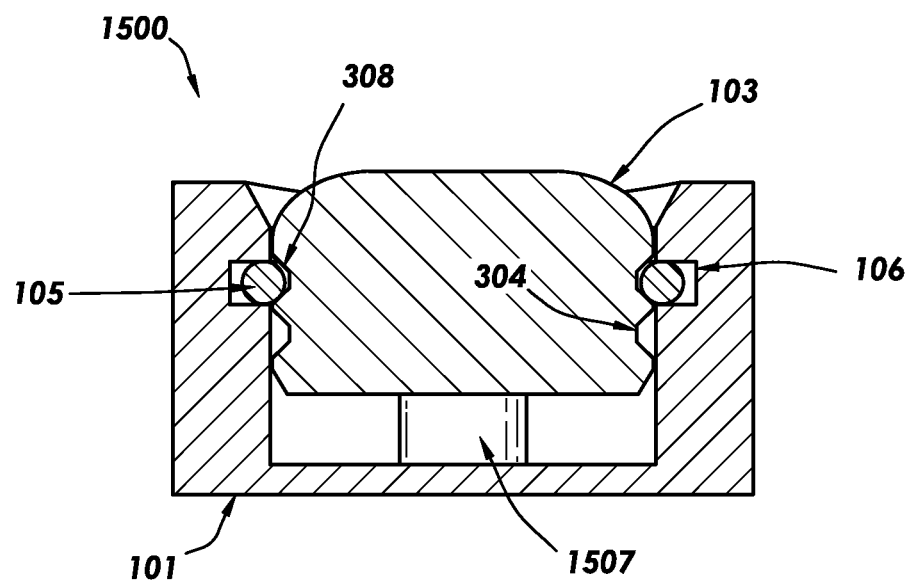
FIG. 15A depicts a force breaker assembly with an electric actuator to provide a return force to cycle a depressed force resistance body to an extended position in response to a control signal.
Figure 15B:
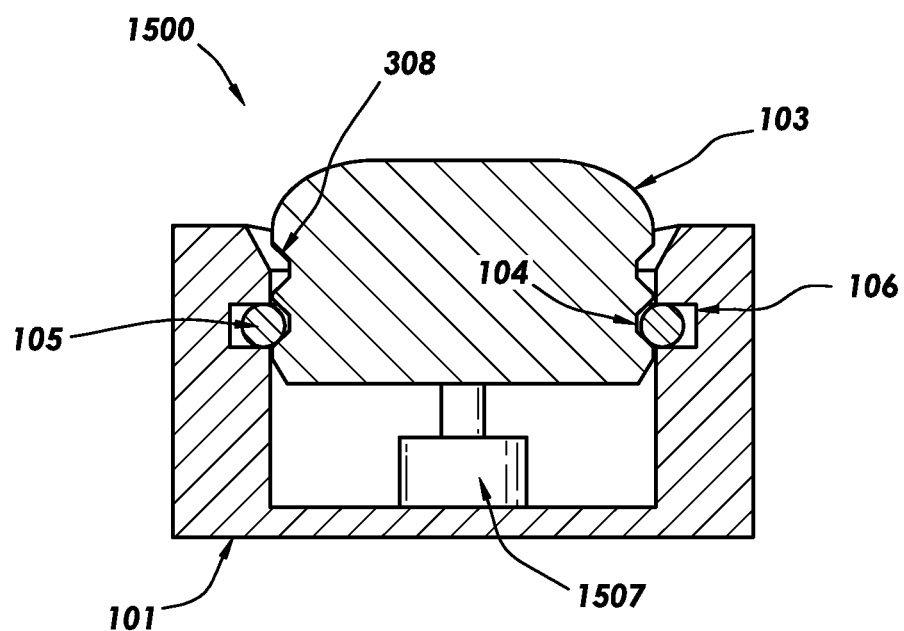
FIG. 15B depicts a force breaker assembly with an electric actuator to provide a return force to cycle a depressed force resistance body to an extended position in response to a control signal.

In yet another embodiment, an electric actuator 1507 (e.g., linear actuator) may replace the Belleville spring stack and provide the return force to cycle the depressed force resistance body 103 to its extended position in response to a control signal, such as is shown in FIGS. 15A and 15B.

Variations and Applications of the Force Breakers

Some embodiments of the force breakers disclosed herein include a resistance surface (e.g., 102) mounted on a force resistance body (e.g., 103) with a cylindrical outer surface and a tapered interior surface. The tapered interior surface (e.g., 104) may be seated against a round wire narrow gap snap ring (e.g., 105), such as those manufactured by Arcon Ring and Specialty Corporation, 123 Easy Street Carol Stream, Ill. 60188. The snap ring may be deployed in a groove (e.g., 106) on an outer housing (e.g., 101) of the force breaker. In operation, the tapered interior surface, in combination with the snap ring, fixes the deployment of the outer surface of the force breaker until a force sufficient to cause the tapered surface to fully expand the snap ring is encountered, at which point the force resistance body is depressed into a lower socket in the force breaker assembly. In some such aspects, the force or load required to push the force resistance body through the resistance of the snap ring is calculated and controlled by the diameter, material, and cross-section of the snap ring, and by the taper angle and length of the tapered interior surface. In some aspects, the use of a narrow gap snap ring as the primary resistance to resistance body movement (e.g., as opposed to use of stacked Bellville springs or a coil spring) allows the entire force breaker assembly to be more compact. Such compactness allows the force breaker assembly to be suitable for use in applications where limited radial distance is available, such as between a downhole tool body and a wellbore wall.

In certain aspects, the force breakers and assemblies thereof operate in a manner that is somewhat analogous to an electrical circuit breaker. For example, in a circuit breaker an electrical load is carried with minimum variation until an electrical overload occurs, at which time the breaker trips out and breaks the circuit, keeping the overload from damaging other components and wiring. In a force breaker disclosed herein (also referred to as a mechanical breaker or a mechanical force breaker), a physical load is carried with only minor variation in position until a physical load limit is reached, at which time the force breaker "trips" by allowing the load bearing surface to depress/retract; thereby, relieving the load and reducing the potential for physical overload and structural damage.

In some aspects of the present force breakers, very little travel is generated by increasing load until a release threshold is reached, at which point significant travel occurs. Traditional springs and shock absorbers respond linearly according to Hooke's law. The displacement (travel) of the spring in response to weight or force is generally linear, such that double the load results in double the travel, until a limit is reached, for example full compression, and the system bottoms out.

In some embodiments, the force breakers has relatively smooth sides on the upper resistance body and includes a short stack of Bellville springs or a short coil spring positioned beneath a lower plunger. In some such embodiments, the resistance body is capable of redeploying to the original, extended position once the load is relieved (e.g., via being pulled out using a socket 109 and/or via biasing from spring 107).

In some embodiments, the upper resistance body includes an additional groove or channel positioned above the taper or taper groove. When the resistance body is depressed sufficiently, the additional groove engages with the snap ring and precludes the resistance body from redeploying, even if the load on the outer resistance surface is relieved.

Analyses performed by present Applicants have found that, in transition drilling from slide mode to rotary mode, the bend side blades of a near bit stabilizer on a bent housing directional assembly can experience loads approaching the yield strength of the parent material. This high load level can cause shock and fatigue stresses, producing catastrophic tool failure. By deploying the force breakers of the present disclosure to provide all or part of the outer surface of the subject bend side blades, the surface is available for steering in slide mode, but capable of depression in rotary mode when the high loads are encountered. After the transition has been traversed and the high load level has fallen off, the blade surface can reset to provide stabilization and a steering surface for further drilling. The same or similar solution can be applied to the scribe side blade or blades of a directional assembly proximal stabilizer or positioning element.

On string stabilizers, where a larger diameter is desired in the build section and a smaller diameter is desired in the lateral section, an embodiment of the force breaker that locks into place upon triggering may be used. In some such embodiments, the force breakers experience limited load in the vertical and build hole. When the string gets into the lateral, the combination of torque, drag, and physical string weight places a greater load on the force breakers, causing them to retract. As some of the force breakers retract, further running puts even more load on the remaining deployed force breakers causing them to retract.

Force breaker embodiments that retract and are captured by the snap ring in the retracted position may be fitted with a threaded socket or hole in the center of the outer surface. This hole or socket may be plugged for running. After the run, the plug can be removed and an eye bolt or similar component can be threaded into the socket to pull the resistance body back into the original position. Alternatively, if a threaded through hole has been used, a threaded rod can be screwed down into the hole and torqued down against the bottom of the housing socket; forcing the resistance body up until it has returned to the original set position. In this manner, string stabilizers utilizing the force breakers of the present disclosure can be readily reset for use in an ensuing well or wells.

In some embodiments, for stabilizers, a stabilizing blade can be fitted on top of multiple (e.g., 2, 3, or more) force breaker assemblies. In such embodiments, the complete depression of the blade would require enough force to overcome the resistance of all of the multiple force breakers.

In some embodiments, the force breakers of the present disclosure may be deployed on solid body casing centralizer tools in a manner similar to that described herein for stabilizers.

In some embodiments, the force breakers of the present disclosure may be deployed on guidance positioning surfaces of a guidance positioning directional drilling assembly.

In some embodiments, the force breakers of the present disclosure may be deployed on the outer extended surfaces of directional drilling assemblies.

In some embodiments, the force breakers of the present disclosure may be deployed on rotary steerable systems or on drilling motors used in conjunction with rotary steerable systems.

The force breakers disclosed herein may also be used as a final fail safe in traditional shock absorbing applications. For example, when deployed at the base of a spring, hydraulic, or pneumatic shock absorber, a force breaking assembly of the present disclosure may be configured to depress at a load level calculated to prevent catastrophic failure. In such applications, when the traditional shock absorbing assembly "bottoms out" and presents a potentially catastrophic load level to the underlying components, the intervening force breaking assembly can provide a final degree of stroke and load absorption; thereby, reducing the potential for damage or catastrophic failure.

Some embodiments provide for a compact mechanical force breaker that is capable of holding a force resistance surface substantially in a predetermined position until a break over load level is attained, causing the force resistance body to depress.

Some embodiments provide for outer surface defining assemblies for downhole tools that can depress under break over loads and reset when the load is relieved, or alternatively can depress under break over loads and remain depressed to reduce the effective diameter of the tool for the remainder of the specific downhole run.

Some embodiments provide for a load mitigating final fail-safe mechanical breaker that can be deployed in conjunction with a primary shock absorption mechanism.

U.S. patent application Ser. No. 15/667,704, entitled "Method, Apparatus By Method, And Apparatus Of Guidance Positioning Members For Directional Drilling", filed Aug. 3, 2017, is incorporated herein by reference in its entirety as if set out in full. Additionally, U.S. patent application Ser. No. 15/808,798, entitled "Bottom Hole Assemblies For Directional Drilling", filed Nov. 9, 2017, is incorporated herein by reference in its entirety as if set out in full. The force breaker assemblies disclosed herein may be used in combination with the methods, apparatus, and assemblies disclosed in these U.S. patent application Ser. Nos. 15/667,704 and 15/808,798.

From the descriptions and figures provided above it can readily be seen that the force breaker technology of the current application may be employed in limiting debilitating mechanical shocks in a broad spectrum of downhole drilling and completion applications. The technology additionally has broad application to other industrial applications.

As would be understood by one skilled in the art, the various aspects disclosed herein may be combined in any of numerous combinations without departing from the scope of this disclosure. For example, a force breaker assembly may include any one or more of the following features: a socket, a capture groove, one or more compression springs, Belville springs, a dissolvable puck, a fluid through-hole, electrical signal generation, and an electric actuator.

Although the genesis of the development of at least some embodiments of the present disclosure was from an analysis of downhole stabilization, it will be appreciated that this technology has application across a broad spectrum of shock load, force limiter, and bumper applications.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A force breaker assembly comprising:
    a housing, the housing including a first channel formed therein;
    a force resistance body positioned at least partially within the housing, the force resistance body including a force resistance engagement surface thereon, and including a second channel formed in the force resistance body;
    a return force member positioned adjacent the force resistance body, opposite the force resistance engagement surface;
    a force resistance ring positioned within the housing and at least partially about the force resistance body;
    wherein when a load is applied to the force resistance engagement surface that is below a preset limit, the force resistance ring remains engaged within the first channel and the second channel, retaining the force resistance body in an extended position; and
    wherein when a load is applied to the force resistance engagement surface that is at or above the preset limit, the force resistance ring is expanded out of the second channel and into the first channel or the force resistance ring is compressed out of the first channel and into the second channel, such that the force resistance body is forced into a depressed position, wherein in the depressed position the force resistance body is depressed at least partially into the housing.

2. The force breaker assembly of claim 1, wherein the second channel is tapered at a taper angle, wherein the first channel forms an expansion channel, and wherein, in the depressed position, the force resistance ring is at least partially engaged within the expansion channel and disengaged from within the tapered second channel; or
wherein the first channel is tapered at a taper angle, wherein the second channel forms a compression channel, and wherein, in the depressed position, the force resistance ring is at least partially engaged within the compression channel and disengaged from within the tapered first channel.

3. The force breaker assembly of claim 1, wherein the force resistance ring includes a snap ring or retaining ring.

4. The force breaker assembly of claim 1, wherein the return force member includes a spring or an electric actuator.

5. The force breaker assembly of claim 1, wherein, in the depressed position, the return force member imparts force onto the force resistance body, biasing the force resistance body toward the extended position.

6. The force breaker assembly of claim 1, wherein in the extended position the force resistance engagement surface is positioned above a top surface of the housing, and wherein in the depressed position the force resistance engagement surface is positioned within the same or substantially the same plane as the top surface of the housing.

7. The force breaker assembly of claim 1, further comprising:
a third channel formed in the force resistance body, the third channel forming a capture groove, wherein, in the second position, the force resistance ring is engaged within the capture groove and the first channel; or
a third channel formed in the housing, the third channel forming a capture groove, wherein, in the second position, the force resistance ring is engaged within the capture groove and the second channel.

8. The force breaker assembly of claim 1, further comprising a retraction socket formed in the force resistance body.

9. The force breaker assembly of claim 1, further comprising a caged roller ball positioned on the engagement surface.

10. The force breaker assembly of claim 1, further comprising a compression spring shock assembly coupled with the housing, wherein the compression spring shock assembly is positioned above the engagement surface, opposite the return force member.

11. The force breaker assembly of claim 10, wherein the compression spring shock assembly includes:
a primary compression spring coil;
a primary load bearing surface positioned on top of the primary compression spring coil; and
a base coupled with the primary compression spring coil opposite the primary load bearing surface, wherein the base is coupled with the housing via shear pins, and wherein the shear pins are configured to shear under full compression loading of the compression spring shock assembly such that the base engages the engagement surface of the force resistance body when the shear pins break.

12. The force breaker assembly of claim 11, wherein the compression spring shock assembly further comprises:
a secondary compression spring coupled with the base; and
a secondary load bearing surface positioned on the secondary compression spring, between the base and the primary load bearing surface.

13. The force breaker assembly of claim 1, wherein the return force member comprises a dissolvable puck, wherein, prior to dissolution of the puck, depression of the force resistance body is prevented or substantially prevented, and wherein, subsequent to at least partial dissolution of the puck, the force resistance body is at least partially depressible into the housing.

14. The force breaker of assembly claim 13, wherein the puck is dissolves upon contact with drilling fluid.

15. The force breaker of assembly claim 13, wherein the force resistance body includes a hole extending therethrough providing a fluid passage through the force resistance body to the puck.

16. The force breaker assembly of claim 1, wherein the return force member comprises an electric actuator configured to provide a return force to force the force resistance body, in the depressed position, to the extended position in response to a signal.

17. The force breaker assembly of claim 1, wherein the engagement surface comprises an abradable material or a dissolvable material.

18. The force breaker assembly of claim 1, wherein depression of the force resistance body completes an electrical circuit that generates a signal indicating that the force resistance body has been depressed.

19. A stabilizer blade assembly comprising:
a stabilizer including a blade; and
at least one force breaker assembly positioned on the blade, wherein the at least one force breaker assembly includes a housing, a force resistance body positioned at least partially within the housing and including an engagement surface, a return force member positioned adjacent the force resistance body opposite the force resistance engagement surface, and a force resistance ring positioned within the housing and at least partially about the force resistance body, wherein the force resistance ring maintains a position of the force resistance body relative to the housing until a preset load is applied to the engagement surface, and where after the preset load is applied to the engagement surface the force resistance body depresses into the housing.

20. The stabilizer blade assembly of claim 19, wherein the at least one force breaker assembly includes an upper force breaker assembly and a lower force breaker assembly, wherein the upper and lower force breaker assemblies are radially aligned on the stabilizer.

21. The stabilizer blade assembly of claim 19, further comprising an outer blade face positioned on the stabilizer such that the at least one force breaker assembly is positioned between the outer blade face and the blade.

22. A method of bearing load imparted onto a component, the method comprising:
positioning a force breaker assembly onto the component, the force breaker assembly including a housing, a force resistance body positioned at least partially within the housing and having an engagement surface thereon, a return force member positioned adjacent the force resistance body opposite the engagement surface, a force resistance ring positioned within the housing and at least partially about the force resistance body; and
bearing load on the engagement surface of the force breaker assembly, wherein, if the load is below a preset limit, the force resistance ring maintains a position of the force resistance body in an extended position and, if the load is above the preset limit, the force resistance ring expands or compresses such that the force resistance body depresses at least partially into the housing into a depressed position.

23. The method of claim 22, wherein the component is a stabilizer including a blade, and wherein the force breaker assembly is positioned on the blade.

24. The method of claim 22, wherein the housing includes a first channel formed therein, wherein a second channel is formed in the force resistance body;

wherein, if the load is below the preset limit, the force resistance ring remains engaged within the first channel and the second channel and retains the force resistance body in the extended position and, if the load is at or above the preset limit, the force resistance ring expands out of the second channel and into the first channel or compresses out of the first channel and into the second channel such that the force resistance body depresses at least partially into the housing into the depressed position.

\* \* \* \* \*